United States Patent Office 2,805,165
Patented Sept. 3, 1957

2,805,165

CERAMIC COMPOSITION

Gilbert Goodman, Niskayuna, N. Y., assignor to General Electric Company, a corporation of New York No Drawing. Application April 25, 1955,
Serial No. 503,818

21 Claims. (Cl. 106—39)

My invention relates to polycrystalline ceramic materials and more particularly to ceramic materials consisting of modified lead metaniobate which are particularly useful as ferroelectric and dielectric materials. Polycrystalline dielectric materials which have been found to have electric polarization properties analogous to the magnetic induction properties of ferromagnetic materials are now generally known as "ferroelectric materials."

One property of these ferroelectric materials is that at a particular temperature called the "Curie point" there is a definite transformation of the crystal structure. Ferroelectric ceramic materials heretofore known, such as alkaline earth titanates, have a crystalline structure identical with or similar to that of the mineral perovskite and undergo a crystalline structure transition such as, for example, the transformation from a tetragonal to a cubic structure as the temperature of the material is raised through its Curie point. Further, these previously known materials have the type-form equation $ABO_3$, in which it has been postulated that the A ions may be selected from the first, second or third group of the periodic table, and the B ions from the second through sixth group. The ceramic materials of my invention differ basically from these materials in that the crystalline structure of my materials do not have the perovskite structure nor are they isomorphous with the previously known perovskite materials. Further, the basic ceramic material of my invention has the type-form equation $A(BO_3)_2$, in which the A ions are principally lead, which appears in group four of the periodic table, and the B ions are principally niobium.

Once polarized, ceramics of the previously known perovskite materials have remanent piezoelectric properties only while they are maintained in a tetragonal or other crystalline state below this Curie temperature. If the internal temperature of the polarized ferroelectric ceramic is raised above this Curie point, the piezoelectric property is destroyed and the material must be reactivated by the application of a polarizing electric field before it will again exhibit remanent piezoelectric properties in its initial crystalline state below the Curie point. Unfortunately, the Curie point of ferroelectric perovskite compounds rarely exceeds 120° C. (the Curie point of barium titanate). The utility of these ceramics as piezoelectric elements in various electro-mechanical transducers is thus severely curtailed by this upper temperature limitation. Where ceramic transducers are employed as compressional wave generators, for example, the maximum power output obtainable is often limited by the resultant temperature rise in the transducer. Moreover, it is often desired to employ ceramic transducers to sense mechanical vibration in locations such as on jet engines that have temperatures far above 120° C. In my copending application, Serial No. 230,788, filed June 9, 1951, now Patent No. 2,729,757, and assigned to the assignee of the present application, I disclose polycrystalline dielectric materials in the form of ceramics having transition temperatures much higher than perovskite ferroelectric compounds. These ceramic materials are composed principally of fired lead metaniobate which may be fluxed with an oxide of a metal selected from the group consisting of titanium and zirconium. The flux improves the mechanical strength and density of ceramic bodies formed from lead metaniobate and is therefore generally desirable. As set forth in my copending application, ceramic dielectric materials made in accordance therewith have moderately high and fairly constant dielectric constants over a wide temperature range from normal room temperature up to temperatures of the order of 540° C. Further, the measured $d_{33}$ piezoelectric constant of these lead metaniobates is in the neighborhood of $5 \times 10^{-11}$ coulombs per newton at room temperature.

In another copending application, Serial No. 449,507, filed August 12, 1954, now Patent No. 2,731,419, and assigned to the assignee of the present application, I disclose polycrystalline dielectric materials in the form of ceramics having transition temperatures much higher than perovskite ferroelectric compounds. These ceramic materials are composed principally of fired lead metaniobate containing a flux comprising an oxide of a metal selected from a first group consisting of titanium and zirconium and an oxide of a metal selected from a second group consisting of chromium and tungsten. As set forth in the latter copending application, ceramic dielectric materials made in accordance therewith have moderately high and fairly constant dielectric constants over a wide temperature range from room temperature up to temperatures of the order of 500° C. Further, the measured $d_{33}$ piezoelectric constant of these modified lead metaniobates is in the neighborhood of $10.1 \times 10^{-11}$ coulombs per newton at room temperature.

In order to impart bulk piezoelectric properties to a ferroelectric ceramic, the domains of its constituent crystals must be given a net common orientation. This is accomplished by subjecting the ceramic to an electric field gradient which at or near the Curie temperature can be relatively small. In the case of the high Curie temperature 570° C. and 540° C., respectively, of the lead metaniobate ceramics disclosed in my two copending applications referred to above, however, Curie point polarization is not feasible because of the low resistivity of the material at or near the Curie point and it is necessary to carry out the piezoelectric activation at a temperature of the order of 250° C. In this lower temperature range, greater field strengths are required to overcome the high coercive force of lead metaniobate. At elevated temperatures of this order the electrical resistivity of the ceramic assumes importance since it governs the voltage which a given sample of material will sustain. For example, the polarizing voltages which may be applied to the ceramics disclosed in my copending application referred to previously are limited to the order of 20 volts per mil at a temperature of the order of 250° C. and 70 volts per mil at a temperature of the order of 225° C., respectively, beyond which field strengths dielectric breakdown occurs. Under these conditions, some, but not the maximum degree of activation may be realized. Inasmuch as saturation polarization can most easily be achieved in a ferroelectric ceramic near the Curie temperature where the polarizing electric field is assisted by the disordering influence of thermal energy in overcoming the coercive field of the ferroelectric, it is desirable to lower the Curie temperatures of ceramic materials of this type to the point of optimum combination of high Curie point and high degree of piezoelectric activity for a given application.

These ceramic materials are also useful as dielectric elements in capacitors and similar apparatus. Ideally, in apparatus of this type, the dielectric constant of the dielectric should not change in response to changes in temperature. However, small changes in dielectric constant with respect to temperature variations may be tolerated, particularly if the relationship between the variables is linear or approximately so. Under such conditions the apparatus or the circuit in which it is to be used may be designed to compensate for the predictable variation.

Accordingly, a principal object of my invention is to provide new dielectric materials in the form of ferroelectric ceramics which may have transition temperatures ranging continuously from a Curie point of about 45° C. up to a temperature of the order of 550° C. Another object of my invention is to provide modified lead metaniobate ceramic materials which may be more completely polarized to exhibit higher remanent piezoelectric properties than has been previously. A still further object of my invention is to provide new polarized ferroelectric ceramic compositions of the lead metaniobate type having higher piezoelectric constant values than previously obtainable. A yet further object of my invention is to provide modified lead metaniobate ceramic materials having a substantially constant dielectric constant over substantial ranges of elevated temperatures.

In accordance with my invention I have produced non-perovskite ceramic compositions of the lead metaniobate type which have excellent dielectric and ferroelectric properties and which may be activated to exhibit higher remanent piezoelectric properties than hithertobefore known for such compositions. The compositions of my invention comprise polycrystalline aggregates formed by firing combinations of lead oxide, niobium pentoxide and an oxide of an element selected from the group consisting of magnesium, calcium, barium and strontium and mixtures thereof, having a generalized formula $$(Pb_{1-x} \cdot A_x)(NbO_3)_2$$

In this formula A represents an element selected from the group consisting of magnesium, calcium, barium and strontium and mixtures thereof. As indicated by the previously set forth generalized formula, portions of the lead content of ceramic lead metaniobate are replaced on a molar basis by equivalent quantities of magnesium, calcium, barium or strontium or mixtures thereof. The immediate effect of such substitutions is a lowering of the Curie temperature of the lead metaniobate from 570° C. It is believed that this lowering of the Curie point is the result of a distortion of the lead metaniobate crystal lattice by the substitution of ions differing slightly from lead ions in size and polarizability.

Table 1

| Composition | Curie Temp., °C. | $d^*$ | $k'^{**}$ |
|---|---|---|---|
| $Pb(NbO_3)_2$ | 570 | 5.0 | ~350 |
| $(Pb_{0.95} \cdot Ba_{0.05})(NbO_3)_2$ | 530 | 12.9 | 184 |
| $(Pb_{0.90} \cdot Ba_{0.10})(NbO_3)_2$ | 500 |  | 163 |
| $(Pb_{0.85} \cdot Ba_{0.15})(NbO_3)_2$ | 465 |  | 210 |
| $(Pb_{0.80} \cdot Ba_{0.20})(NbO_3)_2$ | 415 |  | 186 |
| $(Pb_{0.75} \cdot Ba_{0.25})(NbO_3)_2$ | 375 |  | 350 |
| $(Pb_{0.50} \cdot Ba_{0.50})(NbO_3)_2$ | 375 |  | 190 |
| $(Pb_{0.80} \cdot Sr_{0.20})(NbO_3)_2$ | 475 | 3.2 | 565 |
| $(Pb_{0.65} \cdot Sr_{0.35})(NbO_3)_2$ | 370 | 16.1 | 825 |
| $(Pb_{0.55} \cdot Sr_{0.45})(NbO_3)_2$ | 257 | 0.3 | 1,250 |
| $(Pb_{0.50} \cdot Sr_{0.50})(NbO_3)_2$ | 165 | 18.3 | 2,900 |
| $(Pb_{0.45} \cdot Sr_{0.55})(NbO_3)_2$ | 127 | 8.4 | 3,200 |
| $(Pb_{0.40} \cdot Sr_{0.60})(NbO_3)_2$ | 105 | 1.0 | 2,050 |
| $(Pb_{0.90} \cdot Ca_{0.10})(NbO_3)_2$ | 510 |  | 630 |
| $(Pb_{0.85} \cdot Ca_{0.15})(NbO_3)_2$ | 460 | 5.7 | 280 |
| $(Pb_{0.75} \cdot Ca_{0.25})(NbO_3)_2$ | 403 | 6.3 | 410 |
| $(Pb_{0.70} \cdot Ca_{0.30})(NbO_3)_2$ | 404 | 3.9 | 310 |
| $(Pb_{0.90} \cdot Mg_{0.10})(NbO_3)_2$ | 552 |  | 150 |
| $(Pb_{0.50} \cdot Mg_{0.50})(NbO_3)_2$ | 550 |  | 100 |
| $(Pb_{0.85} \cdot Ba_{0.11} \cdot Sr_{0.04})(NbO_3)_2$ | 469 | 6.5 | 270 |
| $(Pb_{0.85} \cdot Ba_{0.04} \cdot Sr_{0.11})(NbO_3)_2$ | 487 | 6.9 | 270 |
| $(Pb_{0.50} \cdot Ba_{0.375} \cdot Sr_{0.125})(NbO_3)_2$ | 222 | 14.7 | 1,830 |

*$d_{33}$ Piezoelectric constant$\times 10^{-11}$, coulombs per newton.
**Room temperature dielectric constant, measuring frequency 1 mc./sec.

The data set forth in the foregoing table illustrates the relationship of the various constituents of a few ceramics prepared according to this concept which have been formed and fired, and their corresponding dielectric and piezoelectric properties. For example, the dielectric properties as a function of temperature show that solid solution replacement of lead by barium takes place continuously up to about $(Pb_{0.75} \cdot Ba_{0.25})(NbO_3)_2$, beyond which point a second non-ferroelectric crystalline phase (probably $Ba(NbO_3)_2$) appears. Within the solid solution range the Curie point is lowered linearly from 570° to about 375° C. Over this range of composition, i. e. up to about $Ba_{0.25}$, the Curie point dielectric constant is of the order of about 6500. As the barium content is increased beyond $Ba_{0.25}$, the Curie temperature remains constant at about 375° C., but the Curie point dielectric constant progressively decreases to, for example $(Pb_{0.25} \cdot Ba_{0.75})(NbO_3)_2$, about 1500. In all these compositions, however, the dielectric constant has a substantially linear variation with temperature from room temperature up to several hundred degrees C. For example, the dielectric constant of $(Pb_{0.75} \cdot Ba_{0.25})(NbO_3)_2$ varies along a substantially straight line from about 350 at room temperature to about 900 at 260° C. Similarly, the dielectric constant of $(Pb_{0.25} \cdot Ba_{0.75})(NbO_3)_2$ varies substantially as a straight line from about 130 at room temperature to about 350 at 340° C.

In the ceramic compositions in which the lead content is partially replaced by strontium, the Curie temperature is reduced substantially linearly from 570° C. for $Pb(NbO_3)_2$ to 475° C. for a composition of about $(Pb_{0.80} \cdot Sr_{0.20})(NbO_3)_2$, which composition has a Curie point dielectric constant of about 3500. As the strontium content is raised to $Sr_{0.25}$, $Sr_{0.35}$, $Sr_{0.50}$, $Sr_{0.55}$ and $Sr_{0.60}$, the corresponding Curie temperature changes to 440°, 325°, 165°, 127°, 105° and the corresponding dielectric constant at these Curie temperatures is about 4000, 2700, 3150, 5000 and 3100, respectively. Compositions containing strontium in excess of $Sr_{0.60}$ fail to exhibit a Curie point and the dielectric constant assumes a substantially flat, linear relationship to temperature variations. For example, the composition $(Pb_{0.25} \cdot Sr_{0.75})(NbO_3)_2$ has a dielectric constant at room temperature of about 187 and increase of temperature up to about 450° C. does not cause it to vary from this value by more than about 15, a small variation for such a wide temperature range.

The compositions containing calcium substituted for part of the lead behave similarly to the barium-containing ceramics discussed above. In these materials, the progressive increase in calcium content to about $$(Pb_{0.78} \cdot Ca_{0.22})(NbO_3)_2$$

results in a linear decrease in Curie temperature from 570° C. to about 403° C., beyond which point the Curie temperature remains substantially constant. For example, the dielectric constant at the Curie point for $$(Pb_{0.78} \cdot Ca_{0.22})(NbO_3)_2$$

is about 2500.

In the compositions containing magnesium substituted for a portion of the lead, the Curie temperature is lowered to about 552° C. by the substitution of magnesium for about 10 mol percent of the lead, i. e.

$$(Pb_{0.90} \cdot Mg_{0.10})(NbO_3)_2$$

Greater amounts of magnesium do not reduce the Curie temperature but the Curie point dielectric constant is reduced from about 3500 for the $Mg_{0.10}$ composition to about 1000 for the $(Pb_{0.50} \cdot Mg_{0.50})(NbO_3)_2$ composition. The dielectric constants for both the $Mg_{0.10}$ and the $Mg_{0.50}$ compositions vary substantially linearly from room temperature values of about 150 and 100, respectively, to about 460 and 300 at 430° C.

As shown by the data in Table I, compositions in which a portion of the lead content of $Pb(NbO_3)_2$ ceramic is replaced by mixtures of the elements of the group consisting of magnesium, calcium, strontium and barium according to the formula $(Pb_{1-x} \cdot A_x)(NbO_3)_2$, in which A represents not only an element of the group but mixtures thereof and $x$ represents a mol fraction, have unusual and useful dielectric and piezoelectric properties. For example, in the series of compositions in which lead is partially replaced by a mixture of barium and strontium, in which the ratio of barium to strontium is 1:3, the Curie temperature decreases approximately linearly with the increase in the mol percent of the mixture substitution. For example, the approximate composition $(Pb_{0.70} \cdot Ba_{0.075} \cdot Sr_{0.225})(NbO_3)_2$ has a Curie point of about 378° C. The composition listed last in the table has a Curie point of 222° C., and the ceramic of this series having approximately the composition $(Pb_{0.30} \cdot Ba_{0.175} \cdot Sr_{0.525})(NbO_3)_2$ has a Curie point of about 45° C.

Similarly, in compositions in which a portion of the lead content is replaced by barium plus strontium, in which the ratio of barium to strontium is 1:1, the Curie temperature is reduced substantially linearly from 570° C. to about 160° C. for a composition having the approximate formula of $(Pb_{0.50} \cdot Ba_{0.25} \cdot Sr_{0.25})(NbO_3)_2$ and to about 135° C. for a composition having the approximate formula $(Pb_{0.30} \cdot Ba_{0.35} \cdot Sr_{0.35})(NbO_3)_2$.

Compositions in which a portion of the lead content is replaced by barium plus strontium, in which the ratio of barium to strontium is 3:1, the Curie point is reduced substantially linearly from 570° C. to about 235° C. for a composition having the approximate formula $(Pb_{0.60} \cdot Ba_{0.30} \cdot Sr_{0.10})(NbO_3)_2$ and to a Curie point of about 222° C. for a composition having the approximate formula $(Pb_{0.50} \cdot Ba_{0.375} \cdot Sr_{0.125})(NbO_3)_2$ From the foregoing it is apparent that by using element mixtures for A, it is possible to carry the Curie point depression farther than is possible with any single element alone. Thus, the minimum Curie temperature possible in compounds of the type $Pb_x \cdot Sr_{1-x}(NbO_3)_2$ is 105° C. for $Pb_{0.40} \cdot Sr_{0.60}(NbO_3)_2$. As noted above, however, $(Pb_{0.30} \cdot Ba_{0.175} \cdot Sr_{0.525})(NbO_3)_2$ makes possible a Curie point of 45° C.

If desired, the density of these modified lead metaniobate ceramics may be increased by the addition of a flux and flux compensating element such as for example, $ZrO_2$ as a flux and $WO_3$ to compensate for the structural defects introduced by the flux, as taught in my copending application Serial No. 449,507, now Patent No. 2,731,419, referred to previously. One such typical fluxed composition has the approximate formula $(Pb_{0.85} \cdot Ba_{0.04} \cdot Sr_{0.11})[(Nb_{0.994} \cdot Zr_{0.003})O_3]_2$ and is analogous to a composition listed in Table I. This composition was prepared from a mixture of raw materials having the following analysis: 43.80 percent by weight $PbSO_4$, 2.78 percent $SrCO_3$, 1.74 percent $BaC_2O_4$, 45.11 percent $Nb_2O_5$, 4.25 percent $WO_3$ and 2.32 percent $ZrO_2$. The mixture of raw materials was processed as will be more fully described subsequently and the resulting fired body had a room temperature dielectric constant of 940 and a $d_{33}$ piezoelectric constant of $15.8 \times 10^{-11}$ coulombs per newton.

Analogous bodies having the formulae $(Pb_{0.85} \cdot Ba_{0.04} \cdot Sr_{0.11})[(Nb_{0.99} \cdot Zr_{0.0075} \cdot W_{0.0025})O_3]_2$ $(Pb_{0.48} \cdot Ba_{0.40} \cdot Sr_{0.12})[(Nb_{0.95} \cdot Zr_{0.025} \cdot W_{0.025})O_3]_2$ and $Pb_{.48} \cdot Ba_{0.40} \cdot Sr_{0.12})[(Nb_{0.95} \cdot Zr_{0.0375} \cdot W_{0.0125})O_3]_2$ were similarly prepared and found to have room temperature dielectric constants of 850, 2560 and 3630, respectively. These three bodies were found to have $d_{33}$ piezoelectric constants of at least $9.5 \times 10^{-11}$, $2.0 \times 10^{-11}$, and $6.0 \times 10^{-11}$, respectively.

It should be noted, however, that while a flux may be added to the ceramics of my invention, that the modified ceramics of my invention may be formed and fired to produce dense and quite strong bodies without the use of such a flux.

The raw materials used in making these ceramics are preferably reagent grade lead sulfate, high purity niobium pentoxide, and reagent grades of barium oxalate, strontium carbonate, calcium carbonate and magnesium carbonate.

The raw materials are prepared for firing in accordance with the usual ceramic techniques. The materials are first mixed together in a liquid such as acetone or amyl acetate in which the materials are not soluble. The mixture is then dried and pulverized such as by ball-milling into a fine powder so that the coarsest particles will pass a 200 mesh screen. The mixed oxide powder is then compacted into pellets for convenience in handling and the reaction between the constituent oxides accomplished by firing the pellets in an air furnace at about 1275 to 1300° C. for about one hour. The pellets of modified lead metaniobate are withdrawn from the furnace, cooled and recrushed to pass a 200 mesh screen. The resultant powder is then formed into the desired shape and refired. Small elements or bodies may be formed by dry pressing the powder under a pressure of about 10 tons per square inch. The powder may also be admixed with a suitable binder such as, for example, a solution of polyvinyl alcohol in water or the like and formed by pressing, extruding or casting. The water introduced with the binding agent may then be removed in any suitable fashion, for example, by heating the formed bodies at about 110° C. for several hours. The dry bodies are then fired in an air furnace. In order to prevent thermal stresses from causing physical damage to the formed bodies it is preferred that the firing cycle start with the furnace at or near room temperature. The temperature is increased to about 1250 to 1400° C., depending on composition, over a period of about 5 to 7 hours. The bodies are held at about 1250 to 1400° C. for about one hour and then permitted to cool in the furnace back to room temperature. Obviously, the time necessary to fire these ceramic bodies will be dependent upon their size and shape. The ultimate firing temperature is important because little or insufficient sintering occurs below about 1250° C. and the compositions melt above about 1425° C.

The lead content is introduced as a sulfate to take advantage of the high (1000° C.) decomposition temperature of lead sulfate. The materials added to modify the lead metaniobate, i. e. barium oxalate, strontium carbonate, calcium carbonate and magnesium carbonate, all decompose at temperatures below 1000° C. to form their corresponding oxides, BaO, SrO, CaO and MgO. The lead oxide (PbO) is thereby made available in a highly reactive state for combination with the niobium pentoxide and the modifying metal oxides. The rapid rise during the first firing temperature together with a highly reactive state of the lead oxide produces a lead oxide-niobium pentoxide-modifying metal oxide interaction with little opportunity for lead loss by running off or vaporization of the molten lead oxide. Only about 1 to 2% of the theoretical lead oxide content is lost in the process. The firing is carried out in an oxidizing atmosphere, such as is provided by any air furnace, which prevents the reduction of the modified lead metaniobate which may occur if there is an insufficiency of oxygen present.

After cooling the modified lead metaniobate ceramics may be piezoelectrically activated by applying a unidirectional polarizing field of from about 50 to 100 volts per mil thickness for from about ½ to 3 hours. The temperature of the activation depends upon the Curie temperature of the particular composition. For ceramics having Curie points above about 300° C., it has been found that a temperature within about 200° C. to 275° C. is preferable. For materials with lower Curie temperatures than about 300° C., the materials may be activated at temperatures about 20° to 50° below the Curie point using the above voltage gradients. Alternatively, the material may be cooled through its Curie point while subjected to a voltage gradient of about 10 to 30 volts per mil as is known in the art.

In making a transducer it is preferable to activate these lead metaniobate ceramics by applying the polarizing voltage to electrodes previously deposited upon opposite major faces of the ceramic piece. Pure gold or silver deposited on the face of the ceramic has been found to make satisfactory electrodes. These activating electrodes thereafter also function as the electrodes for the transducer. Commercial silvering preparations adapted to be fired onto the surface of the ceramic may be used to form such electrodes. In order to prevent arcing, the polarization is preferably carried out with the ceramic element in an atmosphere of a dielectric gas at 25 to 50 pounds per square inch pressure while it is maintained at the activation temperature. Electronegative gases such as, for example, sulfur dioxide, sulfur hexafluoride, dichlorodifluoromethane, decafluorobutane, octafluoropropane and trifluorobromomethane, among others, are dielectric gases which are suitable as a dielectric atmosphere during activation as disclosed in my copending application Serial No. 449,507.

From the foregoing it may be seen that the present invention provides new ceramic compositions having useful electrical properties. For example, ceramics may be made according to my invention having any desired Curie temperature from about 45° C. to 570° C. These materials are useful, for example, as temperature sensing elements in control apparatus since the change in electrical characteristics of a given ceramic composition occurs at a predeterminable temperature range. In particular, barium containing lead metaniobate ceramics containing from $Ba_{0.001}$ to $Ba_{0.25}$ are useful as piezoelectric materials for transducer and capacitor applications. Compositions containing from $Ba_{0.25}$ to $Ba_{0.85}$ are particularly useful as capacitor dielectrics because of their unusually flat dielectric constant characteristic over substantial temperature ranges.

Compositions containing strontium substituted in part for lead, as pointed out above are useful piezoelectric materials from $Sr_{0.001}$ to $Sr_{0.60}$, and the compositions between $Sr_{0.20}$ and $Sr_{0.60}$ have unusually high dielectric constants at Curie points between about 475° to 105° C. The compositions containing more than $Sr_{0.60}$ are characterized by an unusually flat temperature-dielectric constant relationship. Further, the compositions containing from $Sr_{0.001}$ to $Sr_{0.20}$ are characterized by a linear reduction in Curie point with respect to composition change.

While useful ceramics of my invention may be prepared which contain calcium in partial substitution for lead up to $Ca_{0.85}$, the range $Ca_{0.01}$ to $Ca_{0.25}$ is characterized by a substantially linear relationship between the amount of depression of the Curie point and the mol percent calcium substituted.

The usual characteristics of the magnesium addition ceramics and the mixed addition ceramics have been pointed out previously.

The above specific examples in composition have been set forth as illustrative of the invention, it being understood that various modifications can be made within the true scope and spirit of my invention.

What I claim as new and desire to secure by Letters Patent of the United States is:

1. A dielectric ceramic composition consisting essentially of a fired combination of lead oxide, niobium pentoxide and an oxide of an element selected from the group consisting of magnesium, calcium, strontium, barium and mixtures thereof, in such proportions that the composition has the approximate formula $(Pb_{1-x} \cdot A_x)(NbO_3)_2$, wherein A represents the recited group and in which $x$ has a minimum value of about 0.001 and a maximum value of about 0.85.

2. A ceramic composition as recited in claim 1 in which $x$ has a maximum value of about 0.10 when A is magnesium, about 0.25 when A is calcium, about 0.60 when A is strontium, about 0.25 when A is barium and about 0.85 when A is a mixture of barium and strontium.

3. A ceramic composition as recited in claim 1 in which A is magnesium and $x$ represents a value of from about 0.001 to 0.85.

4. A ceramic composition as recited in claim 3 in which $x$ represents a maximum value of about 0.10.

5. A ceramic composition as recited in claim 1 in which A is calcium and $x$ represents a value of from about 0.001 to 0.85.

6. A ceramic composition as recited in claim 5 in which $x$ represents a maximum value of about 0.25.

7. A ceramic composition as recited in claim 1 in which A is strontium and $x$ represents a value of from about 0.001 to about 0.85.

8. A ceramic composition as recited in claim 7 in which $x$ represents a maximum value of about 0.60.

9. A ceramic composition as recited in claim 8 in which $x$ represents a maximum value of about 0.20.

10. A ceramic composition as recited in claim 7 in which $x$ represents a value from about 0.20 to about 0.60.

11. A ceramic composition as recited in claim 7 in which $x$ represents a value from about 0.60 to about 0.85.

12. A ceramic composition as recited in claim 1 in which A is barium and $x$ represents a value of from about 0.001 to about 0.85.

13. A ceramic composition as recited in claim 12 in which $x$ represents a maximum value of about 0.25.

14. A ceramic composition as recited in claim 12 in which $x$ represents a value from about 0.25 to about 0.85.

15. A ceramic composition as recited in claim 1 in which A consists of a mixture of barium and strontium and $x$ represents a value of from about 0.001 to about 0.85.

16. A ceramic composition as recited in claim 15 in which A is a 3:1 ratio of barium and strontium and $x$ represents a value of from about 0.001 to about 0.85.

17. A ceramic composition as recited in claim 16 in which $x$ has a maximum value of about 0.50.

18. A ceramic composition as recited in claim 15 in which A is a 1:1 ratio of barium and strontium and $x$ represents a value of from about 0.001 to about 0.85.

19. A ceramic composition as recited in claim 18 in which $x$ represents a maximum value of about 0.70.

20. A ceramic composition as recited in claim 15 in which A is a 1:3 ratio of barium and strontium and $x$ represents a value from about 0.001 to about 0.85.

21. A ceramic composition as recited in claim 20 in which $x$ represents a maximum value of about 0.70.

References Cited in the file of this patent

UNITED STATES PATENTS 2,584,324    Bousky _____ Feb. 5, 1952